(12) United States Patent
Faitelson et al.

(10) Patent No.: US 9,177,167 B2
(45) Date of Patent: Nov. 3, 2015

(54) AUTOMATION FRAMEWORK

(75) Inventors: Yakov Faitelson, Elkana (IL); Ohad Korkus, Herziliya (IL); Ophir Kretzer-Katzir, Reut (IL); David Bass, Carmei Yoseph (IL)

(73) Assignee: VARONIS SYSTEMS, INC., New York, NY (US)

( * ) Notice: Subject to any disclaimer, the term of this patent is extended or adjusted under 35 U.S.C. 154(b) by 390 days.

(21) Appl. No.: 13/384,452

(22) PCT Filed: May 26, 2011

(86) PCT No.: PCT/IL2011/000407
§ 371 (c)(1),
(2), (4) Date: Mar. 20, 2012

(87) PCT Pub. No.: WO2011/148375
PCT Pub. Date: Dec. 1, 2011

(65) Prior Publication Data
US 2012/0173583 A1 Jul. 5, 2012

Related U.S. Application Data

(63) Continuation-in-part of application No. 13/106,023, filed on May 12, 2011, now Pat. No. 8,533,787, and a (Continued)

(51) Int. Cl.
*G06F 17/30* (2006.01)
*G06F 21/62* (2013.01)

(Continued)

(52) U.S. Cl.
CPC ...... *G06F 21/6218* (2013.01); *G06F 17/30082* (2013.01); *G06F 17/301* (2013.01);

(Continued)

(58) Field of Classification Search
CPC ............ G06F 21/6218; G06F 2221/2113; G06F 17/30038; G06F 21/604; G06F 21/62; G06F 2221/2141; G06F 2221/2147; G06Q 10/06

USPC ......... 707/783, 661, 713, 741, 812, 603, 694, 707/781
See application file for complete search history.

(56) References Cited

U.S. PATENT DOCUMENTS 5,465,387 A 11/1995 Mukherjee
5,889,952 A 3/1999 Hunnicutt et al.
(Continued)

FOREIGN PATENT DOCUMENTS

CN 1588889 A 3/2005
EP 1 248 178 B1 10/2002
(Continued)

OTHER PUBLICATIONS

An International Preliminary Report on Patentability dated Jul. 30, 2013, which issued during the prosecution of Applicant's PCT/IL2011/000902.

(Continued)

*Primary Examiner* — Jay Morrison
*Assistant Examiner* — Dangelino Gortayo
(74) *Attorney, Agent, or Firm* — Ladas & Parry LLP

(57) ABSTRACT

An information technology management system for use in enterprise data management including a metadata supply subsystem which receives metadata from a network, an access permissions management subsystem for managing access permissions to data elements in the network and an access permissions management operation implementation subsystem which automatically governs the operation of the access permissions management subsystem, the access permissions management operation implementation subsystem having at least one of first, second, third and fourth modes of operation. The first mode of operation includes operating the access permissions management subsystem, the second mode of operation includes simulating the operation of the access permissions management subsystem, the third mode of operation included providing a report of proposed changes in access permissions and the fourth mode of operation includes providing an actionable report of multiple steps in implementation of proposed changes in access permissions to data elements for approval.

26 Claims, 2 Drawing Sheets

Related U.S. Application Data continuation-in-part of application No. 13/014,762, filed on Jan. 27, 2011, now Pat. No. 8,805,884.

(60) Provisional application No. 61/348,860, filed on May 27, 2010, provisional application No. 61/348,806, filed on May 27, 2010.

(51) Int. Cl.
  *G06F 21/60* (2013.01)
  *G06Q 10/06* (2012.01)

(52) U.S. Cl.
  CPC ......... *G06F17/30038* (2013.01); *G06F 21/604* (2013.01); *G06F 2221/2101* (2013.01); *G06F 2221/2141* (2013.01); *G06Q 10/0633* (2013.01)

(56) References Cited

U.S. PATENT DOCUMENTS

| | | | |
|---|---|---|---|
| 5,899,991 A | 5/1999 | Karch | |
| 6,308,173 B1 | 10/2001 | Glasser et al. | |
| 6,338,082 B1 | 1/2002 | Schneider | |
| 6,393,468 B1 | 5/2002 | McGee | |
| 6,772,350 B1 | 8/2004 | Belani et al. | |
| 6,928,439 B2 | 8/2005 | Satoh | |
| 7,017,183 B1 | 3/2006 | Frey et al. | |
| 7,031,984 B2 | 4/2006 | Kawamura et al. | |
| 7,068,592 B1 | 6/2006 | Duvaut et al. | |
| 7,403,925 B2 | 7/2008 | Schlesinger et al. | |
| 7,421,740 B2 | 9/2008 | Fey et al. | |
| 7,555,482 B2 | 6/2009 | Korkus | |
| 7,606,801 B2 | 10/2009 | Faitelson et al. | |
| 7,716,240 B2 | 5/2010 | Lim | |
| 7,743,420 B2 | 6/2010 | Shulman et al. | |
| 7,937,393 B2* | 5/2011 | Prahlad et al. | 707/741 |
| 8,041,749 B2* | 10/2011 | Beck | 707/803 |
| 8,239,925 B2 | 8/2012 | Faitelson et al. | |
| 8,266,702 B2* | 9/2012 | Naldurg et al. | 726/25 |
| 8,621,610 B2* | 12/2013 | Oberheide et al. | 726/22 |
| 8,639,724 B1* | 1/2014 | Sorenson et al. | 707/796 |
| 8,667,556 B2* | 3/2014 | Chang et al. | 726/1 |
| 8,775,944 B2* | 7/2014 | Hayton | 715/744 |
| 2003/0048301 A1 | 3/2003 | Menninger | |
| 2003/0051026 A1 | 3/2003 | Carter et al. | |
| 2003/0231207 A1 | 12/2003 | Huang | |
| 2004/0030915 A1 | 2/2004 | Sameshima et al. | |
| 2004/0186809 A1 | 9/2004 | Schlesinger et al. | |
| 2004/0249847 A1 | 12/2004 | Wang et al. | |
| 2004/0254919 A1 | 12/2004 | Giuseppini | |
| 2005/0086529 A1 | 4/2005 | Buchsbaum | |
| 2005/0108206 A1 | 5/2005 | Lam et al. | |
| 2005/0120054 A1 | 6/2005 | Shulman et al. | |
| 2005/0203881 A1 | 9/2005 | Sakamoto et al. | |
| 2005/0246762 A1 | 11/2005 | Girouard et al. | |
| 2005/0278334 A1 | 12/2005 | Fey et al. | |
| 2006/0064313 A1 | 3/2006 | Steinbarth et al. | |
| 2006/0184459 A1 | 8/2006 | Parida | |
| 2006/0184530 A1 | 8/2006 | Song et al. | |
| 2006/0277184 A1 | 12/2006 | Faitelson et al. | |
| 2007/0061487 A1 | 3/2007 | Moore et al. | |
| 2007/0073698 A1 | 3/2007 | Kanayama et al. | |
| 2007/0094265 A1 | 4/2007 | Korkus | |
| 2007/0101387 A1 | 5/2007 | Hua et al. | |
| 2007/0112743 A1 | 5/2007 | Giampaolo et al. | |
| 2007/0156659 A1 | 7/2007 | Lim | |
| 2007/0156693 A1 | 7/2007 | Soin et al. | |
| 2007/0203872 A1 | 8/2007 | Flinn et al. | |
| 2007/0244899 A1 | 10/2007 | Faitelson et al. | |
| 2007/0266006 A1 | 11/2007 | Buss | |
| 2007/0282855 A1 | 12/2007 | Chen et al. | |
| 2007/0294258 A1* | 12/2007 | Caldwell et al. | 707/10 |
| 2008/0034402 A1 | 2/2008 | Botz et al. | |
| 2008/0162707 A1 | 7/2008 | Beck et al. | |
| 2008/0172720 A1* | 7/2008 | Botz et al. | 726/3 |
| 2008/0270462 A1 | 10/2008 | Thomsen | |
| 2008/0271157 A1 | 10/2008 | Faitelson et al. | |
| 2009/0100058 A1 | 4/2009 | Faitelson et al. | |
| 2009/0119298 A1 | 5/2009 | Faitelson et al. | |
| 2009/0150981 A1 | 6/2009 | Amies et al. | |
| 2009/0198892 A1 | 8/2009 | Alvarez et al. | |
| 2009/0249446 A1 | 10/2009 | Jenkins et al. | |
| 2009/0265780 A1 | 10/2009 | Korkus et al. | |
| 2009/0320088 A1 | 12/2009 | Gill et al. | |
| 2010/0023491 A1* | 1/2010 | Huang et al. | 707/3 |
| 2010/0037324 A1 | 2/2010 | Grant et al. | |
| 2010/0058434 A1* | 3/2010 | Chusing et al. | 726/1 |
| 2010/0070881 A1 | 3/2010 | Hanson et al. | |
| 2011/0060916 A1 | 3/2011 | Faitelson et al. | |
| 2011/0061111 A1 | 3/2011 | Faitelson et al. | |
| 2011/0184989 A1 | 7/2011 | Faitelson et al. | |
| 2011/0247074 A1* | 10/2011 | Manring et al. | 726/26 |
| 2012/0221550 A1 | 8/2012 | Korkus et al. | |
| 2012/0291100 A1 | 11/2012 | Faitelson et al. | |

FOREIGN PATENT DOCUMENTS

| | | |
|---|---|---|
| WO | 2011/030324 A1 | 3/2011 |
| WO | 2011/148375 A1 | 12/2011 |

OTHER PUBLICATIONS

Varonis; DatAdvantage User Guide, Version 1.0, Aug. 30, 2005; 71 pages.
Varonis; DatAdvantage User Guide, Version 2.0, Aug. 24, 2006; 118 pages.
Varonis; DatAdvantage User Guide, Version 2.5, Nov. 27, 2006; 124 pages.
Varonis; DatAdvantage User Guide, Version 2.6, Dec. 15, 2006; 127 pages.
Varonis; DatAdvantage User Guide, Version 2,7, Feb. 6, 2007; 131 pages.
Varonis; DatAdvantage User Guide, Version 3.0, Jun. 20, 2007; 153 pages.
Varonis; A List of database tables in DatAdvantage 2.7, Feb. 6, 2007; 1 page.
Varonis; A List of database tables in DatAdvantage 3.0, Jun. 20, 2007; 1 page.
Sara C. Madeira; "Clustering, Fuzzy Clustering and Biclustering: An Overview", pp. 31-53, Jun. 27, 2003.
Sara C. Madeira, et al; "Biclustering Algorithms for Biological Data Analysis: A Survey", IEEE Transactions on Computational Biology and Bioinformatics, vol. 1, No. 1, Jan.-Mar. 2004; pp. 24-45; http://www.cs.princeton.edu/courses/archive/spr05/cos598E/bib/bicluster.pdf.
Varonis; "Accelerating Audits with Automation: Understanding Who's Accessing Your Unstructured Data", Oct. 8, 2007; 7 pages.
Varonis; "Entitlement Review: A Practitioner's Guide" 16 pages; Copyright 2007 by Varonis Systems.
Varonis; "The Business Case for Data Governance" Mar. 27, 2007, 8 pages.
Alex Woodie; "Varonis Prevents Unauthorized Access to Unstructured Data", Four Hundred Stuff, vol. 7, No. 29, Jul. 31, 2007, 3 pages.
S.R. Kleiman; "Vnodes: An Architecture for Multiple File System Types in Sun UNIX", ; Usenix Association: Summer Conference Proceedings, Atlanta 1986; 10 pages.
Sahadeb De, et al; "Secure Access Control in a Multi-user Geodatabase", available on the Internet at URL http://www10.giscafe.com. 2005, 10 pages.
Edgar Weippl, et al; "Content-based Management of Document Access Control", 14th International Conference on Applications of Prolog (INAP), 2001, 9 pages.
Findutils; GNU Project Free Software Foundation (FSF), 3 pages, Nov. 2006.
GENUNIX; "Writing Filesystems—VFS and Vnode interfaces", 5 pages, Oct. 2007.
U.S. Appl. No. 12/673,691, filed Feb. 16, 2010.
U.S. Appl. No. 60/688,486, filed Jun. 7, 2005.
U.S. Appl. No. 61/348,806, filed May 27, 2010.

(56) References Cited

OTHER PUBLICATIONS

U.S. Appl. No. 61,348,860, filed May, 27, 2010.
German Office Action dated Sep. 14, 1612 issued during prosecution of German Patent Application 11 2006 001 378.5.
USPTO NFOA mailed Feb. 12, 2008 in connection with U.S. Appl. No. 11/258,256.
USPTO FOA mailed Aug. 1, 2008 in connection with U.S. Appl. No. 11/258,256.
USPTO NFOA mailed Oct. 31, 2008 in connection with U.S. Appl. No. 11/635,736.
USPTO NFOA mailed Dec. 14, 2010 in connection with U.S. Appl. No. 11/786,522.
USPTO NFOA mailed Jul. 9, 2010 in connection with U.S. Appl. No. 11/789,884.
USPTO FOA mailed Dec. 14, 2010 in connection with U.S. Appl. No. 11/789,884.
USPTO NFOA dated Sep. 16, 2010 in connection with U.S. Appl. No. 11/871,028.
USPTO FOA dated Apr. 28, 2011 in connection with U.S. Appl. No. 11/871,028.
USPTO NFOA dated Sep. 14, 2012 in connection with U.S. Appl. No. 12/861,967.
USPTO NFOA dated Jul. 11, 2012 in connection with U.S. Appl. No. 13/014,762.
USPTO RR dated Nov. 21, 2012 in connection with U.S. Appl. No. 13/106,023.
ISR dated May 23, 2011 issued during prosecution of PCT/IL11/00065.
ISR and Written Opinion dated May 20, 2010 issued during prosecution of PCT/IL10/00069.
ISR and Written Opinion dated May 24, 2011 issued during prosecution of PCT/IL11/00077.
ISR and Written Opinion dated Apr. 13, 2012 issued during prosecution of PCT/IL11/00902.
ISR and Written Opinion dated Nov. 2, 2011 issued during prosecution of PCT/IL11/00407.
IPRP dated Nov. 27, 2012 issued during PCT/IL2011/000407.
ISR and Written Opinion dated Nov. 15, 2011 issued during prosecution of PCT/IL11/00408.

* cited by examiner

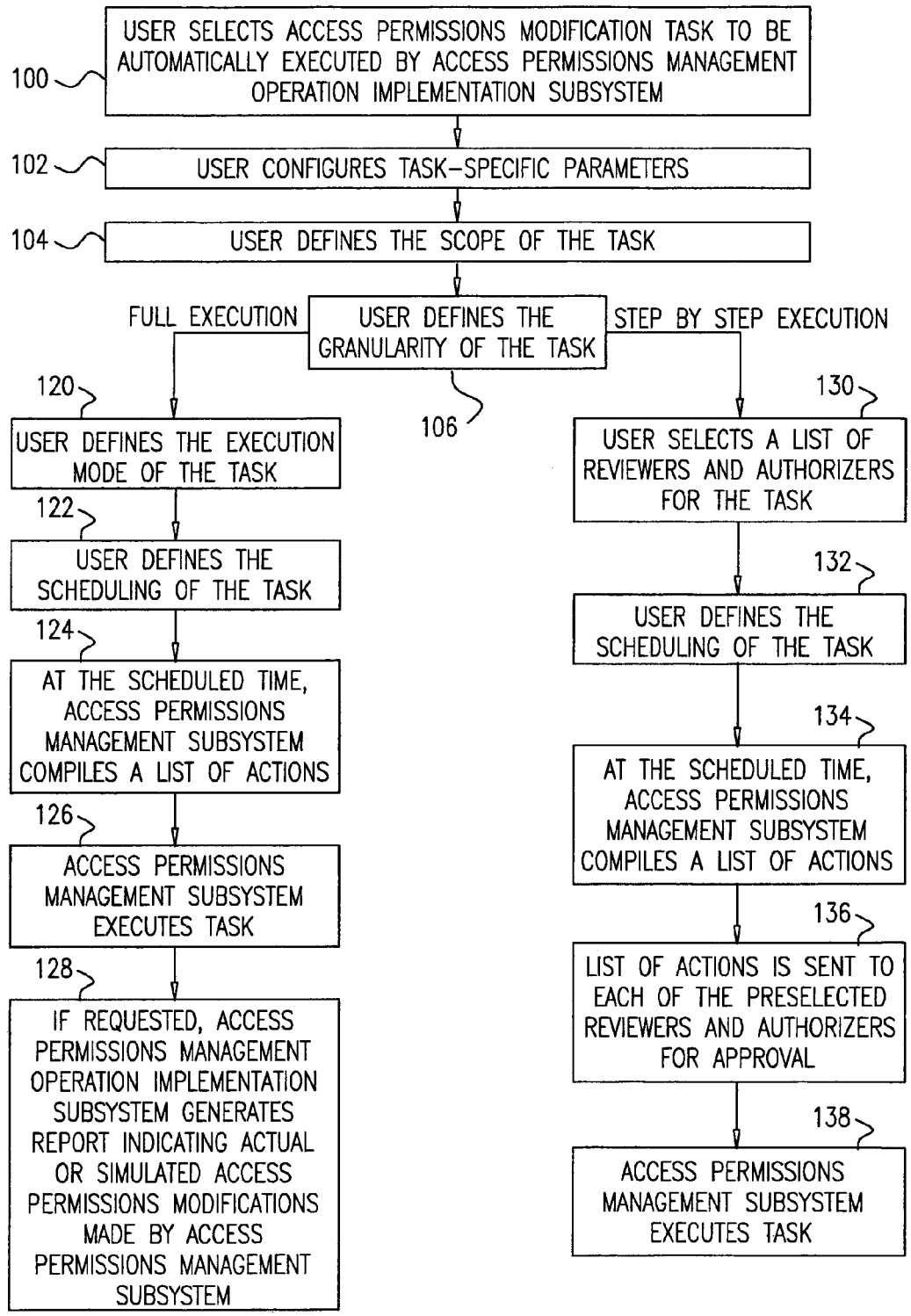

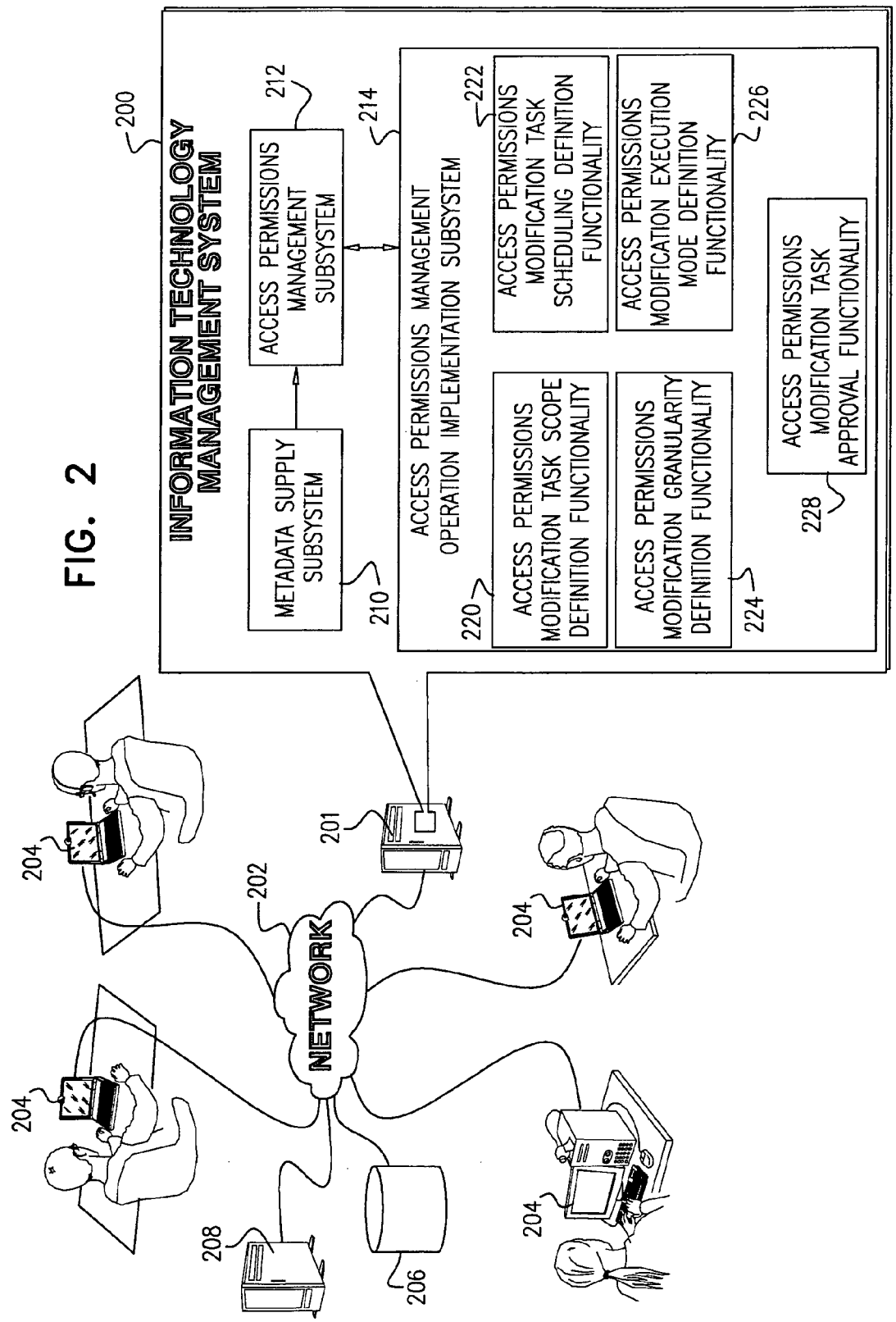

AUTOMATION FRAMEWORK

REFERENCE TO RELATED APPLICATIONS

Reference is made to U.S. Provisional Patent Application Ser. No. 61/348,806, filed May 27, 2010 and entitled "AUTOMATING ENFORCEMENT OF IT WORKFLOWS", the disclosure of which is hereby incorporated by reference and priority of which is hereby claimed pursuant to 37 CFR 1.78 (a) (4) and (5)(i).

Reference is also made to U.S. Provisional Patent Application Ser. No. 61/348,860, filed May 27, 2010 and entitled "IMPROVED TOOLS FOR DATA MANAGEMENT BY IT ADMINISTRATORS", the disclosure of which is hereby incorporated by reference and priority of which is hereby claimed pursuant to 37 CFR 1.78(a) (4) and (5)(i).

Reference is also made to U.S. patent application Ser. No. 13/014,762, filed Jan. 27, 2011, and entitled "AUTOMATIC RESOURCE OWNERSHIP ASSIGNMENT SYSTEMS AND METHODS", the disclosure of which is hereby incorporated by reference and priority of which is hereby claimed pursuant to 37 CFR 1.78(a) (1) and (2)(i).

Reference is also made to U.S. patent application Ser. No. 13/106,023, filed May 12, 2011, and entitled "AUTOMATIC RESOURCE OWNERSHIP ASSIGNMENT SYSTEM AND METHOD", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801;

U.S. Published Patent Application Nos. 2007/0244899, 2008/0271157, 2009/0100058, 2009/0119298; 2009/0265780; 2011/0060916 and 2011/0061111; and U.S. patent application Ser. No. 12/673,691.

FIELD OF THE INVENTION

The present invention relates to automatic management of data elements.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482, 7,606,801 and 7,743,420; and U.S. Published Patent Application Nos.: 2003/0051026; 2004/0249847; 2005/0108206; 2005/0203881; 2005/0086529; 2006/0064313; 2006/0184530; 2006/0184459; 2007/0203872; 2007/0244899; 2008/0271157; 2009/0100058; 2009/0119298 and 2009/0265780.

SUMMARY OF THE INVENTION

The present invention provides improved systems and methodologies for automatic management of data elements.

There is thus provided in accordance with a preferred embodiment of the present invention an information technology management system for use in enterprise data management including a metadata supply subsystem which receives metadata from a network, an access permissions management subsystem employing at least part of the metadata for managing access permissions to data elements in the network and an access permissions management operation implementation subsystem which automatically governs the operation of the access permissions management subsystem, the access permissions management operation implementation subsystem having at least one of first, second, third and fourth modes of operation. The first mode of operation includes operating the access permissions management subsystem to change access permissions to at least some of the data elements in the network and thereafter providing a report indicating actual changes in access permissions, the second mode of operation includes simulating the operation of the access permissions management subsystem in changing access permissions to at least some of the data elements in the network and thereafter providing a report indicating simulated changes in access permissions, the third mode of operation included providing a report of proposed changes in access permissions without first simulating the operation of the access permissions management subsystem and the fourth mode of operation includes providing an actionable report of multiple steps in implementation of proposed changes in access permissions to data elements for approval of each of the multiple steps by respective persons before automatic execution of the multiple steps.

In accordance with a preferred embodiment of the present invention, the access permissions management operation implementation subsystem has at least two of the first, the second, the third and the fourth modes of operation. More preferably, the access permissions management operation implementation subsystem has at least three of the first, the second, the third and the fourth modes of operation. Most preferably, the access permissions management operation implementation subsystem has the first, the second, the third and the fourth modes of operation.

Preferably, the access permissions management operation implementation subsystem includes at least one of access permissions modification task scope granularity selection functionality operative to enable selection of a selectable scope of an access permissions modification task, access permissions modification task scheduling granularity selection functionality operative to enable selection of a selectable schedule of the access permissions modification task, access permissions modification granularity selection functionality operative to enable selection of selectable granularity of the access permissions modification task, access permissions modification execution mode granularity selection functionality operative to enable selection of a selectable execution mode of the access permissions modification task and access permissions modification task approval functionality operative to enable approval of the access permissions modification task by the respective persons. More preferably, the access permissions management operation implementation subsystem includes at least two of the access permissions modification task scope granularity selection functionality, the access permissions modification task scheduling granularity selection functionality, the access permissions modification granularity selection functionality, the access permissions modification execution mode granularity selection functionality, and the access permissions modification task approval functionality.

Even more preferably, the access permissions management operation implementation subsystem includes at least three of the access permissions modification task scope granularity selection functionality, the access permissions modification task scheduling granularity selection functionality, the access permissions modification granularity selection functionality, the access permissions modification execution mode granularity selection functionality, and the access permissions modification task approval functionality. Even more preferably, the access permissions management operation implementation subsystem includes at least four of the access permissions modification task scope granularity selection functionality, the access permissions modification task scheduling granularity selection functionality, the access permissions modification granularity selection functionality, the access permissions modification execution mode granularity selection functionality, and the access permissions modification task approval functionality.

Most preferably, the access permissions management operation implementation subsystem includes the access permissions modification task scope granularity selection functionality, the access permissions modification task scheduling granularity selection functionality, the access permissions modification granularity selection functionality, the access permissions modification execution mode granularity selection functionality, and the access permissions modification task approval functionality.

In accordance with a preferred embodiment of the present invention the access permissions modification task is a remediation process.

Preferably, the scope is defined by a set of rules based on at least one of metadata associated with data elements, content of data elements and actual access to data elements. In accordance with a preferred embodiment of the present invention the selectable schedule is one of a future one-time execution schedule and a repetitive schedule. Preferably, the selectable granularity is one of full execution and step-by-step execution. In accordance with a preferred embodiment of the present invention the selectable execution mode is one of actual execution, simulation of execution and generation of a report of proposed execution.

Preferably, the respective persons are corresponding owners of the data elements. In accordance with a preferred embodiment of the present invention the metadata relates to at least one of actual access, access permissions and content of each of the data elements.

In accordance with a preferred embodiment of the present invention the third mode of operation includes providing a report of user selectable granularity of proposed changes in access permissions.

There is also provided in accordance with a preferred embodiment of the present invention an information technology management method for use in enterprise data management including receiving metadata from a network, employing at least part of the metadata for managing access permissions to data elements in the network, automatically governing the employing at least part of the metadata for managing access permissions to data elements in the network and at least one of changing access permissions to at least some of the data elements in the network and thereafter providing a report indicating actual changes in access permissions, simulating changing access permissions to at least some of the data elements in the network and thereafter providing a report indicating simulated changes in access permissions, providing a report of proposed changes in access permissions without first simulating changing access permissions to at least some of the data elements in the network and providing an actionable report of multiple steps in implementation of proposed changes in access permissions to data elements for approval of each of the multiple steps by respective persons before automatic execution of the multiple steps.

In accordance with a preferred embodiment of the present invention the information technology management method for use in enterprise data management includes at least two of changing access permissions to at least some of the data elements in the network and thereafter providing a report indicating actual changes in access permissions, simulating changing access permissions to at least some of the data elements in the network and thereafter providing a report indicating simulated changes in access permissions, providing a report of proposed changes in access permissions without first simulating changing access permissions to at least some of the data elements in the network and providing an actionable report of multiple steps in implementation of proposed changes in access permissions to data elements for approval of each of the multiple steps by respective persons before automatic execution of the multiple steps. More preferably, the information technology management method for use in enterprise data management includes at least three of changing access permissions to at least some of the data elements in the network and thereafter providing a report indicating actual changes in access permissions, simulating changing access permissions to at least some of the data elements in the network and thereafter providing a report indicating simulated changes in access permissions, providing a report of proposed changes in access permissions without first simulating changing access permissions to at least some of the data elements in the network and providing an actionable report of multiple steps in implementation of proposed changes in access permissions to data elements for approval of each of the multiple steps by respective persons before automatic execution of the multiple steps.

Most preferably, the information technology management method for use in enterprise data management includes changing access permissions to at least some of the data elements in the network and thereafter providing a report indicating actual changes in access permissions, simulating changing access permissions to at least some of the data elements in the network and thereafter providing a report indicating simulated changes in access permissions, providing a report of proposed changes in access permissions without first simulating changing access permissions to at least some of the data elements in the network and providing an actionable report of multiple steps in implementation of proposed changes in access permissions to data elements for approval of each of the multiple steps by respective persons before automatic execution of the multiple steps.

In accordance with a preferred embodiment of the present invention the information technology management method for use in enterprise data management also includes at least one of selection of a selectable scope of an access permissions modification task, selection of a selectable schedule of the access permissions modification task, selection of selectable granularity of the access permissions modification task, selection of a selectable execution mode of the access permissions modification task and enabling approval of the access permissions modification task by the respective persons.

More preferably, the information technology management method for use in enterprise data management also includes at least two of selection of a selectable scope of an access permissions modification task, selection of a selectable schedule of the access permissions modification task, selection of selectable granularity of the access permissions modification task, selection of a selectable execution mode of the access permissions modification task and enabling approval of the access permissions modification task by the respective persons.

Even more preferably, the information technology management method for use in enterprise data management also includes at least three of selection of a selectable scope of an access permissions modification task, selection of a selectable schedule of the access permissions modification task, selection of selectable granularity of the access permissions modification task, selection of a selectable execution mode of the access permissions modification task and enabling approval of the access permissions modification task by the respective persons.

Even more preferably, the information technology management method for use in enterprise data management also includes at least four of selection of a selectable scope of an access permissions modification task, selection of a selectable schedule of the access permissions modification task, selection of selectable granularity of the access permissions modification task, selection of a selectable execution mode of the access permissions modification task and enabling approval of the access permissions modification task by the respective persons.

Most preferably, the information technology management method for use in enterprise data management also includes selection of a selectable scope of an access permissions modification task, selection of a selectable schedule of the access permissions modification task, selection of selectable granularity of the access permissions modification task, selection of a selectable execution mode of the access permissions modification task and enabling approval of the access permissions modification task by the respective persons.

Preferably, the access permissions modification task is a remediation process.

In accordance with a preferred embodiment of the present invention the scope is defined by a set of rules based on at least one of metadata associated with data elements, content of data elements and actual access to data elements.

Preferably, the selectable schedule is one of a future one-time execution schedule and a repetitive schedule.

In accordance with a preferred embodiment of the present invention the selectable granularity is one of full execution and step-by-step execution.

Preferably, the selectable execution mode is one of actual execution, simulation of execution and generation of a report of proposed execution.

In accordance with a preferred embodiment of the present invention the respective persons are corresponding owners of the data elements.

Preferably, the metadata relates to at least one of actual access, access permissions and content of each of the data elements.

In accordance with a preferred embodiment of the present invention the providing a report of proposed changes in access permissions without first simulating changing access permissions to at least some of the data elements in the network includes providing a report of user selectable granularity of proposed changes in access permissions.

BRIEF DESCRIPTION OF THE DRAWINGS

The present invention will be understood and appreciated more fully from the following detailed description, taken in conjunction with the drawings in which:

FIG. 1 is a simplified flowchart indicating steps in the operation of an information technology management system constructed and operative in accordance with a preferred embodiment of the present invention; and FIG. 2 is a simplified block diagram illustration of the information technology management system of FIG. 1.

DETAILED DESCRIPTION OF PREFERRED EMBODIMENTS

Reference is now made to FIG. 1, which is a simplified flowchart indicating steps in the operation of an information technology management system constructed and operative in accordance with a preferred embodiment of the present invention. The information technology management system of FIG. 1 is preferably suitable for operating in an enterprise computer network including multiple disparate clients, data elements, computer hardware resources and computer software resources, and preferably includes a metadata supply subsystem which receives metadata from the network, an access permissions management subsystem employing at least part of the metadata for managing access permissions to data elements in the network and an access permissions management operation implementation subsystem which automatically governs the operation of the access permissions management subsystem.

The term "access permissions" as used throughout is used in a broader sense to include not only access permissions as is commonly used which is to allow the user to access a data element at his initiative, but also to include indirect access permissions, such as access to a user group that has access permissions appertaining thereto or distribution lists associated therewith. The term "access permissions" is defined herein also to include ownership of a data element in the sense of responsibility for the authorization of permissions to the data element, and a subscription to automatically generate reports based on the user's access relationship with data elements which are the subject of those data reports.

Preferably, the metadata relates to at least one of actual access, access permissions and content of each of the data elements.

The access permissions management operation implementation subsystem preferably has at least one of the flowing first, second, third and fourth modes of operation:

a first mode of operation including operating the access permissions management subsystem to change access permissions to at least some of the data elements in the network and thereafter providing a report indicating actual changes in access permissions;

a second mode of operation including simulating the operation of the access permissions management subsystem in changing access permissions to at least some of the data elements in the network and thereafter providing a report indicating simulated changes in access permissions;

a third mode of operation including providing a report of proposed changes in access permissions without first simulating the operation of the access permissions management subsystem; and a fourth mode of operation including providing an actionable report of multiple steps in implementation of proposed changes in access permissions to data elements for approval of each of the multiple steps by respective persons before automatic execution of the multiple steps.

As shown in FIG. 1, a user initially selects an access permissions modification task to be automatically executed by the access permissions management operation implementation subsystem (100) on a set of data elements. An access permissions modification task may be, for example, a remediation process such as described in U.S. Provisional Patent Applications 61/348,806 and 61/348,860, owned by the assignee and incorporated by reference herein.

After selecting the access permissions modification task to be automatically executed, the user configures task-specific parameters (102). The parameters may include, for example, user groups to remediate and the file servers on which to perform the remediation.

Thereafter, the user defines the scope of the access permissions modification task (104). The scope may be defined by a set of rules based on, for example, any combination of metadata associated with the data elements, content of the data elements and actual access to the data elements.

Thereafter, the user defines the granularity of the access permissions modification task (106). The granularity of the access permissions modification task can be defined as full execution of the task or step-by-step execution of the task, whereby each step of the execution of the task requires user or owner approval before proceeding to the subsequent step of the task.

In a case where full execution is selected, the user then defines the execution mode of the task (120). The execution mode may be, for example, one of actual execution of the task, simulation of the execution of the task, or generation of a report of proposed modifications. The user also defines the scheduling of the task (122). The scheduling may be defined, for example, as a future, one-time, execution, or a repetitive task.

At a scheduled time, the access permissions management subsystem preferably utilizes metadata from the network to compile a list of actions (124) according to the predefined task-specific parameters and the predefined scope of scope of the access permissions modification task. Thereafter the task is executed (126), and, if requested, the access permissions management operation implementation subsystem generates a report indicating actual or simulated access permissions modifications made by the access permissions management subsystem.

In a case where step-by-step execution is selected, the user selects a list of reviewers and authorizers for the task (130) and defines the scheduling of the task (132).

At the scheduled time, the access permissions management subsystem preferably utilizes metadata from the network to compile a list of actions (134) according to the predefined task-specific parameters and the predefined scope of execution of the access permissions modification task. An access permissions modification task may be, for example, a remediation process such as described in U.S. Provisional Patent Applications 61/348,806 and 61/348,860, owned by the assignee and incorporated by reference herein.

The list of actions is sent to each of the preselected reviewers and authorizers (136), asking them to approve each action. Once responses from the authorizers and reviewers are collected, the system executes the task in accordance with the approved actions (138).

Reference is now made to FIG. 2, which is a simplified block diagram illustration of the information technology management system of FIG. 1. As shown in FIG. 2, the information technology management system 200 preferably resides on a server 201 connected to a network 202 including multiple disparate clients 204, data elements 206 and computer hardware resources 208.

Information technology management system 200 preferably includes a metadata supply subsystem 210 which receives metadata from network 202, an access permissions management subsystem 212 employing at least part of the metadata for managing access permissions to data elements in network 202, and an access permissions management operation implementation subsystem 214 which automatically governs the operation of the access permissions management subsystem 212.

Preferably, access permissions management operation implementation subsystem 214 includes access permissions modification task scope definition functionality 220 operative to enable definition of a scope of an access permissions modification task, access permissions modification task scheduling definition functionality 222 operative to enable definition of a schedule of an access permissions modification task, access permissions modification granularity definition functionality 224 operative to enable definition of the granularity of an access permissions modification task, access permissions modification execution mode definition functionality 226 operative to enable definition of an execution mode of an access permissions modification task, and access permissions modification task approval functionality 228 operative to enable approval of an access permissions modification task by the respective persons.

It will be appreciated by persons skilled in the art that the present invention is not limited by what has been particularly shown and described hereinabove. Rather, the invention also includes various combinations and subcombinations of the features described hereinabove as well as modifications and variations thereof, which would occur to persons skilled in the art upon reading the foregoing and which are not in the prior art.

The invention claimed is:

1. An information technology management system for use in enterprise data management, said system comprising:
   a computer including:
      a processor;
      a memory; and
      a non-transitory, tangible computer-readable medium in which computer program instructions are stored, which instructions, when read by said computer, cause the computer to enable efficient management of access permissions;
   a metadata supply subsystem which receives metadata from a network, said metadata relating to actual access and access permissions;
   an access permissions management subsystem employing said metadata for managing access permissions to data elements in said network; and
   an access permissions management operation implementation subsystem which automatically governs the operation of said access permissions management subsystem, said access permissions management operation implementation subsystem having at least one of first and second modes of operation, and at least one of third and fourth modes of operation,
      said first mode of operation including simulating the operation of said access permissions management subsystem in changing access permissions to at least some of said data elements in said network and thereafter providing a report indicating simulated changes in access permissions;
      said second mode of operation including providing a report of proposed changes in access permissions without first simulating the operation of said access permissions management subsystem;
      said third mode of operation including providing an actionable report of multiple steps in implementation of proposed changes in access permissions to data elements for approval before automatic execution of said multiple steps; and
      said fourth mode of operation including operating said access permissions management subsystem to change access permissions to at least some of said data elements in said network and thereafter providing a report indicating actual changes in access permissions,
   said access permissions management operation implementation subsystem being configured, responsive to executing one of said first and second modes of operation, to execute at least one of said third and fourth modes of operation;

and wherein said access permissions management operation implementation subsystem comprises at least one of:

access permissions modification task scope granularity selection functionality operative to enable selection of a selectable scope of an access permissions modification task;

access permissions modification task scheduling granularity selection functionality operative to enable selection of a selectable schedule of said access permissions modification task;

access permissions modification granularity selection functionality operative to enable selection of selectable granularity of said access permissions modification task;

access permissions modification execution mode granularity selection functionality operative to enable selection of a selectable execution mode of said access permissions modification task; and access permissions modification task approval functionality operative to enable approval of said access permissions modification task;

and wherein said scope is defined by a set of rules based on at least one of said metadata.

2. The information technology management system for use in enterprise data management according to claim 1 and wherein said access permissions management operation implementation subsystem has said first and said second modes of operation, and at least one of said third and said fourth modes of operation.

3. The information technology management system for use in enterprise data management according to claim 1 and wherein said access permissions management operation implementation subsystem has said third and said fourth modes of operation, and at least one of said first and said second modes of operation.

4. The information technology management system for use in enterprise data management according to claim 1 and wherein said access permissions management operation implementation subsystem has said first, said second, said third and said fourth modes of operation.

5. The information technology management system for use in enterprise data management according to claim 1 and wherein said access permissions management operation implementation subsystem comprises at least two of said access permissions modification task scope granularity selection functionality, said access permissions modification task scheduling granularity selection functionality, said access permissions modification granularity selection functionality, said access permissions modification execution mode granularity selection functionality, and said access permissions modification task approval functionality.

6. The information technology management system for use in enterprise data management according to claim 1 and wherein said access permissions management operation implementation subsystem comprises at least three of said access permissions modification task scope granularity selection functionality, said access permissions modification task scheduling granularity selection functionality, said access permissions modification granularity selection functionality, said access permissions modification execution mode granularity selection functionality, and said access permissions modification task approval functionality.

7. The information technology management system for use in enterprise data management according to any of claims 1 and wherein said access permissions management operation implementation subsystem comprises at least four of said access permissions modification task scope granularity selection functionality, said access permissions modification task scheduling granularity selection functionality, said access permissions modification granularity selection functionality, said access permissions modification execution mode granularity selection functionality, and said access permissions modification task approval functionality.

8. The information technology management system for use in enterprise data management according to claim 1 and wherein said access permissions management operation implementation subsystem comprises said access permissions modification task scope granularity selection functionality, said access permissions modification task scheduling granularity selection functionality, said access permissions modification granularity selection functionality, said access permissions modification execution mode granularity selection functionality, and said access permissions modification task approval functionality.

9. The information technology management system for use in enterprise data management according to claim 1 and wherein said access permissions modification task is a remediation process.

10. The information technology management system for use in enterprise data management according to claim 1 and wherein said selectable schedule is one of a future one-time execution schedule and a repetitive schedule.

11. The information technology management system for use in enterprise data management according to claim 1 and wherein said selectable granularity is one of full execution and step-by-step execution.

12. The information technology management system for use in enterprise data management according to claim 1 and wherein said selectable execution mode is one of actual execution, simulation of execution and generation of a report of proposed execution.

13. The information technology management system for use in enterprise data management according to claim 1 and wherein said metadata relates to at least one of actual access, access permissions and content of each of said data elements.

14. The information technology management system for use in enterprise data management according to claim 1 and wherein said second mode of operation includes providing a report of user selectable granularity of proposed changes in access permissions.

15. An information technology management method for use in enterprise data management comprising:

receiving metadata from a network, said metadata relating to actual access and access permissions;

employing said metadata for managing access permissions to data elements in said network;

automatically governing said employing at least part of said metadata for managing access permissions to data elements in said network;

one of:

simulating changing access permissions to at least some of said data elements in said network and thereafter providing a report indicating simulated changes in access permissions; and providing a report of proposed changes in access permissions without first simulating changing access permissions to at least some of said data elements in said network;

followed by at least one of:
  providing an actionable report of multiple steps in implementation of proposed changes in access permissions to data elements for approval before automatic execution of said multiple steps; and
  changing access permissions to at least some of said data elements in said network and thereafter providing a report indicating actual changes in access permissions; and
at least one of:
  selecting a selectable scope of an access permissions modification task;
  selecting a selectable schedule of said access permissions modification task;
  selecting selectable granularity of said access permissions modification task;
  selecting a selectable execution mode of said access permissions modification task; and
  enabling approval of said access permissions modification task;
  wherein said scope is defined by a set of rules based on at least one of said metadata.

16. The information technology management method for use in enterprise data management according to claim 15 and comprising:
one of:
  simulating changing access permissions to at least some of said data elements in said network and thereafter providing a report indicating simulated changes in access permissions; and
  providing a report of proposed changes in access permissions without first simulating changing access permissions to at least some of said data elements in said network;
followed by both:
  providing an actionable report of multiple steps in implementation of proposed changes in access permissions to data elements for approval before automatic execution of said multiple steps; and
  changing access permissions to at least some of said data elements in said network and thereafter providing a report indicating actual changes in access permissions.

17. The information technology management method for use in enterprise data management according to claim 15 and also comprising at least two of:
  selection of a selectable scope of an access permissions modification task;
  selection of a selectable schedule of said access permissions modification task;
  selection of selectable granularity of said access permissions modification task;
  selection of a selectable execution mode of said access permissions modification task; and
  enabling approval of said access permissions modification task.

18. The information technology management method for use in enterprise data management according to claim 15 and also comprising at least three of:
  selection of a selectable scope of an access permissions modification task;
  selection of a selectable schedule of said access permissions modification task;
  selection of selectable granularity of said access permissions modification task;
  selection of a selectable execution mode of said access permissions modification task; and
  enabling approval of said access permissions modification task.

19. The information technology management method for use in enterprise data management according to claim 15 and also comprising at least four of:
  selection of a selectable scope of an access permissions modification task;
  selection of a selectable schedule of said access permissions modification task;
  selection of selectable granularity of said access permissions modification task;
  selection of a selectable execution mode of said access permissions modification task; and
  enabling approval of said access permissions modification task.

20. The information technology management method for use in enterprise data management according to claim 15 and also comprising:
  selection of a selectable scope of an access permissions modification task;
  selection of a selectable schedule of said access permissions modification task;
  selection of selectable granularity of said access permissions modification task;
  selection of a selectable execution mode of said access permissions modification task; and
  enabling approval of said access permissions modification task.

21. The information technology management method for use in enterprise data management according to claim 15 and wherein said access permissions modification task is a remediation process.

22. The information technology management method for use in enterprise data management according to claim 15 and wherein said selectable schedule is one of a future one-time execution schedule and a repetitive schedule.

23. The information technology management method for use in enterprise data management according to claim 15 and wherein said selectable granularity is one of full execution and step-by-step execution.

24. The information technology management method for use in enterprise data management according to claim 15 and wherein said selectable execution mode is one of actual execution, simulation of execution and generation of a report of proposed execution.

25. The information technology management method for use in enterprise data management according to claim 15 and wherein said metadata relates to at least one of actual access, access permissions and content of each of said data elements.

26. The information technology management method for use in enterprise data management according to claim 15 and wherein said providing a report of proposed changes in access permissions without first simulating changing access permissions to at least some of said data elements in said network includes providing a report of user selectable granularity of proposed changes in access permissions.

* * * * *